US005894461A

United States Patent [19]
Fosler et al.

[11] Patent Number: 5,894,461
[45] Date of Patent: Apr. 13, 1999

[54] SELECTION OF AN ACTIVE ACCESSOR IN A MULTI-ACCESSOR AUTOMATED DATA STORAGE LIBRARY

[75] Inventors: Christine Lynette Fosler; Frank David Gallo, both of Tucson; Kristy Colleen Judd, Pomerene; Anthony Andrew Lambert; William Henry Travis, both of Tucson, all of Ariz.

[73] Assignee: International Business Machines Corporation, Armonk, N.Y.

[21] Appl. No.: 08/961,280

[22] Filed: Oct. 30, 1997

[51] Int. Cl.[6] .................................................. G11B 17/22
[52] U.S. Cl. .................................................. 369/34; 369/36
[58] Field of Search .................................. 369/34, 36, 37, 369/38, 39, 30, 178, 179, 180, 181

[56] References Cited

U.S. PATENT DOCUMENTS

| | | | |
|---|---|---|---|
| 5,450,385 | 9/1995 | Ellis et al. | 369/34 |
| 5,471,445 | 11/1995 | Emberty et al. | 369/34 |
| 5,513,156 | 4/1996 | Hanaoka et al. | 369/34 |
| 5,646,918 | 7/1997 | Dimitri et al. | 369/34 |
| 5,703,843 | 12/1997 | Katsuyama et al. | 369/34 |
| 5,761,161 | 6/1998 | Gallo et al. | 369/36 |

FOREIGN PATENT DOCUMENTS

| | | |
|---|---|---|
| 4-313854 | 11/1992 | Japan. |
| 6-52611 | 2/1994 | Japan. |

OTHER PUBLICATIONS

'Error–Recovery Procedure for an Automated Library', IBM Technical Disclosure Bulletin, vol. 19, No. 8, Jan. 1977, p. 2923.
'Control of Accessor Stalemate Contention', IBM Technical Disclosure Bulletin, vol. 19, No. 8, Jan. 1977, p. 2921.

*Primary Examiner*—Tan Dinh
*Attorney, Agent, or Firm*—John H. Holcombe; Robert M. Sullivan

[57] ABSTRACT

An automated data storage library for storing and accessing a plurality of data storage media stored in a plurality of storage slots. A plurality of accessors access the data storage media between the storage slots and data recording device (s), an operator interface allows an operator to designate one of the accessors as active, and a library manager is interconnected with the accessors and with the operator interface to set operation modes of the accessors. The library manager sets the operation mode of one of the accessors to the active mode (A) in an initial decision, first (1), based on the relative conditions of the accessors, the conditions having three levels (a) fully available, (b) degraded, and (c) not available, and, if all the accessors are in the same level of condition, second (2), an arbitrarily selected one of the accessors, and (B) in an override decision, based on the active accessor if designated at the operator interface, or, if not designated, on the one of the accessors last in the active mode.

21 Claims, 5 Drawing Sheets

SELECTION OF AN ACTIVE ACCESSOR IN A MULTI-ACCESSOR AUTOMATED DATA STORAGE LIBRARY

TECHNICAL FIELD

This invention relates to automated data storage libraries which transport portable data storage media between storage slots and data recording devices, and, more particularly, to multi-accessor automated data storage libraries wherein one of the accessors can be made active and other accessors can be placed on standby.

BACKGROUND OF THE INVENTION

Automated data storage libraries are known for providing cost effective access to large quantities of stored data. Generally, data storage libraries include a large number of storage slots in which are stored portable data storage media. The typical portable data storage medium is a tape cartridge or an optical cartridge. An accessor typically accesses the data storage media from the storage slots and delivers the accessed media to a data recording device for reading and/or writing data on the accessed media. Suitable electronics both operate the accessor and operate the data recording devices to transmit and/or receive data from an attached on-line host computer system.

In a conventional automated data storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated data storage libraries today, each model displaying various different features. One example is the IBM 3494 Data Storage Library. Some of the automated data storage libraries have dual or multiple accessors to provide a level of redundancy, in that, one accessor is the "active" accessor and the other is a "spare". Thus, if the active accessor fails, another may take over the accessor function and be the active accessor.

Conventionally, one of the accessors is always the active accessor, and the other(s) are always spare. For example, in a dual accessor automated data storage library, the accessors are typically located at opposite ends of an aisle (between the parallel walls of storage slots). One of the accessors is at the "A" end of the aisle and is typically the active accessor, and the other accessor is at the opposite "B" end of the aisle and is typically the standby accessor. The only time that the accessors are switched is when the active accessor fails.

SUMMARY OF THE INVENTION

It is an object of the present invention to improve the performance of multi-accessor automated data storage libraries by designating as the "active" accessor, the best accessor from among the multiple accessors of a multi-accessor automated data storage library.

Disclosed is an automated data storage library for storing and accessing a plurality of data storage media stored in a plurality of storage slots, and having data recording device(s) for receiving the data storage media and reading and/or writing data thereon, comprising:

a plurality of accessors for accessing and transporting the data storage media between the storage slots and the data recording device;

an operator interface, allowing an operator to communicate with the automated data storage library to designate one of the accessors as active; and a library manager interconnected with the plurality of accessors and with said operator interface for setting operation modes of the plurality of accessors between an active mode and a standby mode, only one of the plurality of accessors being in the active mode at one time, the library manager setting the operation mode of one of the accessors to the active mode (A) in an initial decision, first (1), based upon the relative conditions of the accessors, the conditions having three levels (a) fully available, (b) degraded, and (c) not available, and, if all the accessors are in the same level of condition, second (2), an arbitrarily selected one of the accessors, and (B) in an override decision, based upon the designated active accessor, if designated at the operator interface or, if not designated thereat, the one of the accessors last in the active mode, unless the previously designated active accessor is not available.

Each of the accessors may include as components, at least one gripper, a scanner, a communication link and robotic components, and the accessor condition levels may comprise (a) fully available if all of the components are operational, (b) degraded in the order of (i) at least one of the grippers and the scanner are available, (ii) the scanner is not available and two of the grippers are available, and (iii) only one of the grippers is available, and (c) not available upon any of the conditions including (i) all of the grippers are not operational or (ii) the communication link is not operational or (iii) the robotic components are not operational.

For a fuller understanding of the present invention, reference should be made to the following detailed description taken in conjunction with the accompanying drawings.

DETAILED DESCRIPTION OF THE INVENTION

Figure 1:
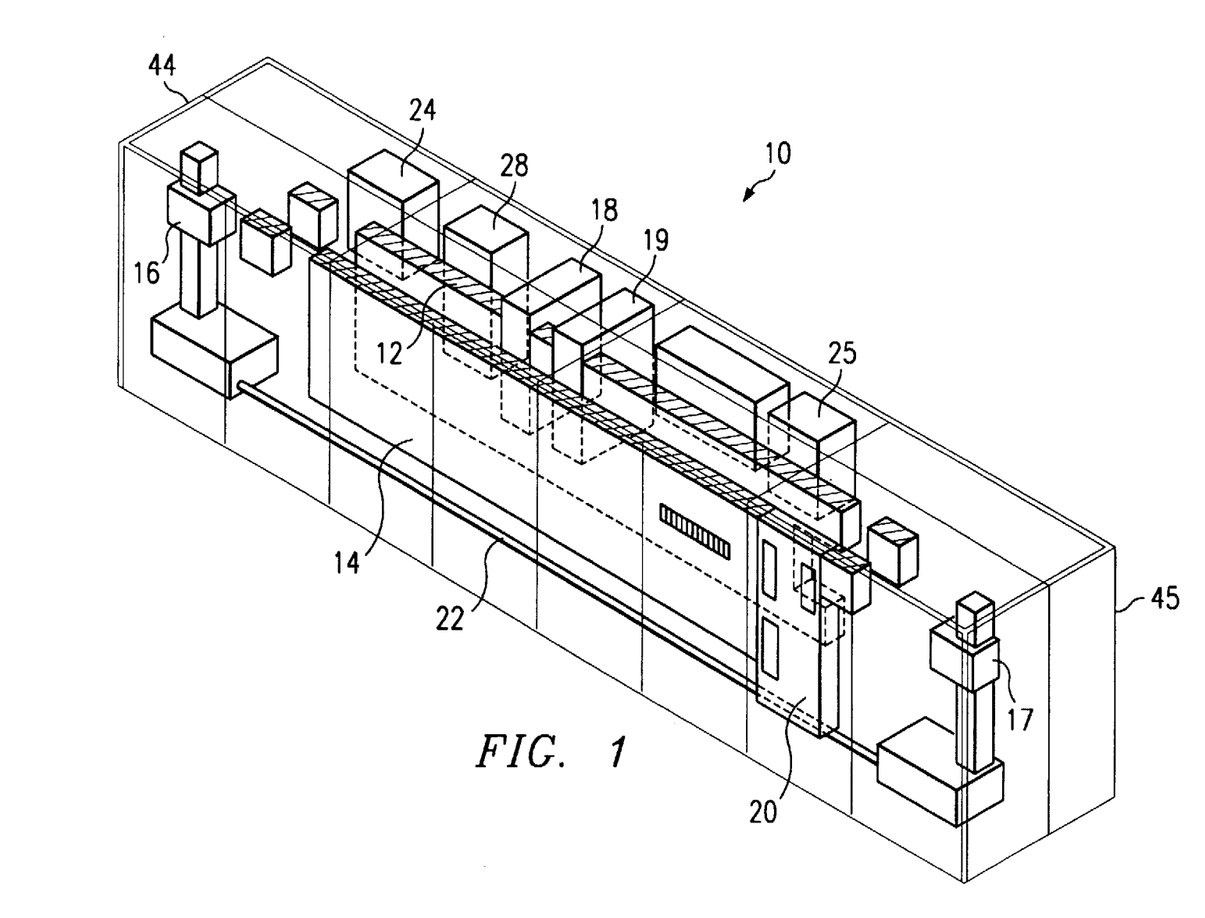
FIG. 1 is a diagrammatic representation of an automated data storage library in accordance with the present invention.

Referring to FIG. 1, an automated data storage library 10 is illustrated having an inner "wall" of storage slots 12 and an outer wall of storage slots 14, which store data storage media. Typically, the data storage media are self-contained within a portable container, or cartridge. Examples of such data storage media include magnetic tape cartridges or cassettes, optical disk cartridges of various types, including ROM, WORM and rewritable, and in various formats. For universal reference to any of these types of media, the terms "data storage media" or "media" are used herein.

The library of the present invention is a multi-accessor library, the embodiment of the present invention illustrated in FIG. 1 having at least two accessors 16 and 17. An accessor is a robotic device which accesses the data storage media from the storage slots and delivers the accessed media to data recording devices 18 and 19 for reading and/or writing data on the accessed media and returns the media to storage slots 12 and 14. A media import/export port 20 is provided for insertion or retrieval of data storage media into or out of the library. The accessors 16 and 17 run on a rail 22 in an aisle between the inner wall of storage slots 12 and the outer wall of storage slots 14.

In the illustrated embodiments multiple library managers 24 and 25 are provided to manage the positioning and access of the accessors 16 and 17 to transport data storage media between storage slots 12 and 14, import/export port 20 and data recording devices 18 and 19.

An operator interface 28 is provided for allowing a servicing operator or systems operator to communicate with the automated data storage library.

Figure 2:
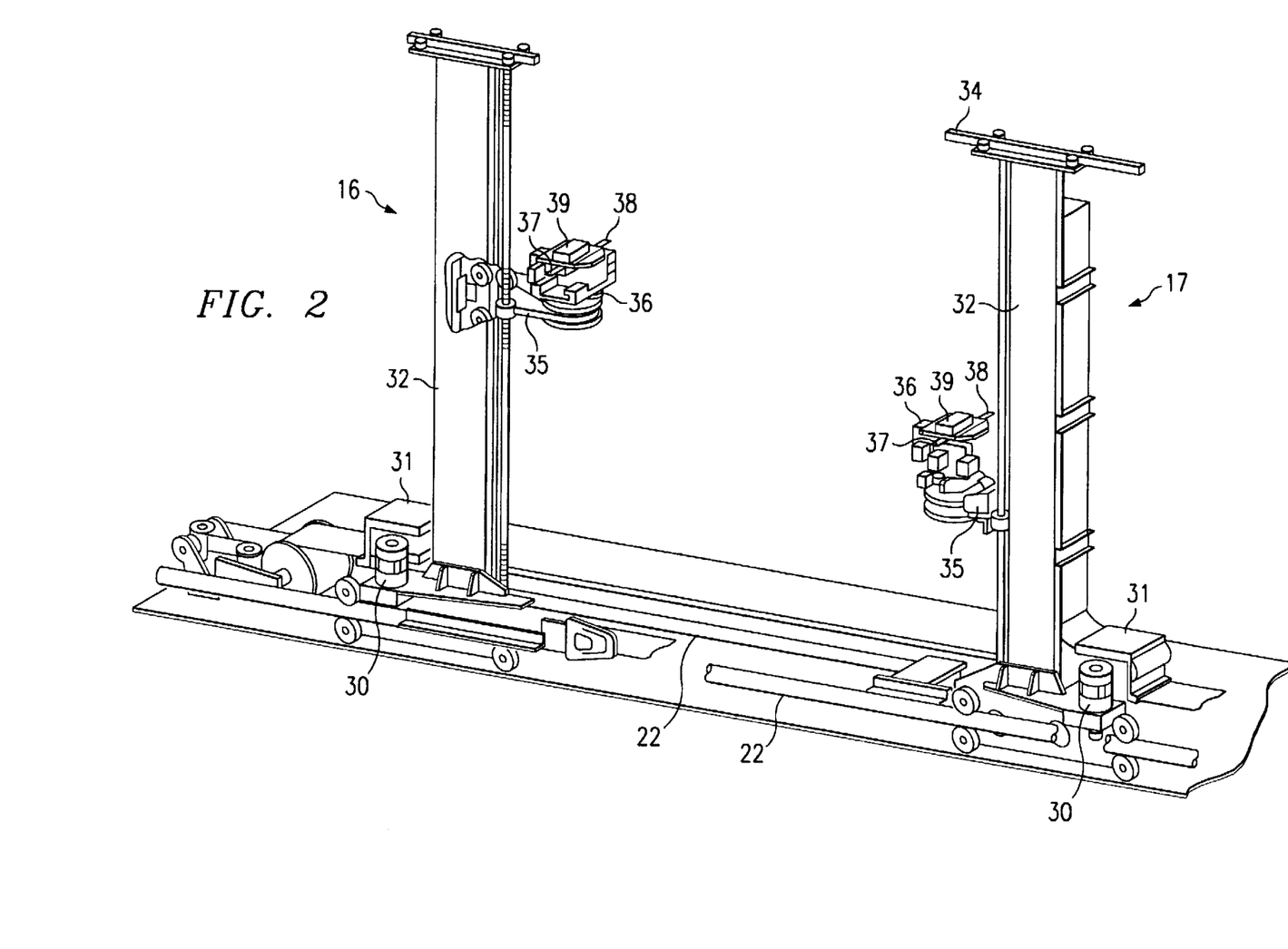
FIG. 2 is a perspective view illustration of the accessors of the automated data storage library of FIG. 1.

The accessors 16 and 17 are illustrated in greater detail in FIG. 2. The accessors run on the rails 22 along the library aisle by motors 30 in running servo sections 31. A pillar 32 is vertically attached to each of the running sections 31 of the accessors and rides in top rail 34 to provide vertical stability. Robotic manipulators 36 are mounted on lifting servo sections 35 which can move vertically along the pillars 32.

In the embodiment illustrated in FIG. 2, each of the robotic manipulators 36 includes as components, one or two grippers 37 and 38 and a scanner 39. The grippers 37 and 38 are at opposite sides of the manipulator 36 and can access media at either storage slots 12 or 14 in FIG. 1 and the manipulator 36 can rotate 180° to switch the grippers to the opposite sides. Thus, either gripper can grip a data storage medium at an outside storage slot 14 of FIG. 1 and be rotated to deliver the data storage medium to a data recording device 18 at the inside of the library. The scanners 39 can read storage information, such as bar code data, from the data storage media or from locations on the library to identify the media or to identify the location of the accessor in the library.

An example of an automated data storage library 10 is the IBM 3494 Data Storage Library, which stores magnetic tape cartridges.

Typically, the library manager 24 or 25 comprises a data processor and suitable data memory and data storage capability to control the operation of the library 10. Specifically, the library manager 24 or 25 controls the actions of the robot accessors 16 and 17. The conventional library manager 24 or 25 is interconnected through a provided interface to a host processor (not shown), which provides commands requesting access to particular data storage media or to media in particular storage slots. Commands for access to data or to locations on the data storage media and information to be recorded on, or to be read from, selected data storage media are typically transmitted directly between the drives 18–19 and the host. The library manager 24 or 25 is typically provided with a database, which includes tables and programs. Examples of library managers 24 and 25 are an IBM personal computer or IBM RS/6000 processor.

Figure 3:
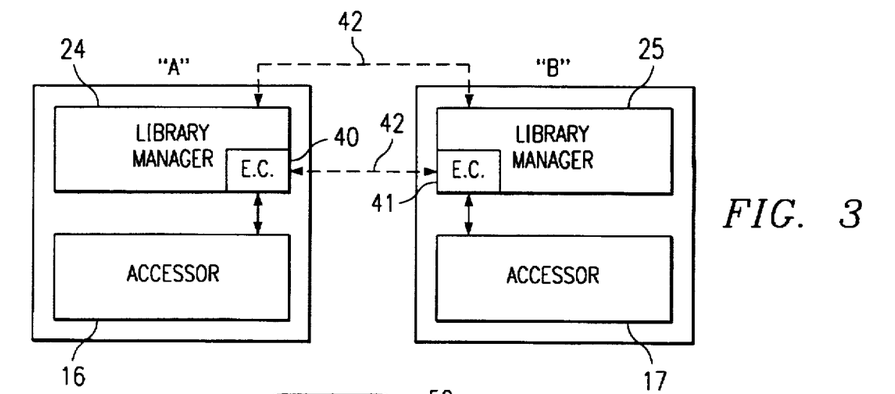
FIG. 3 is a block diagram of the library managers and accessors of the automated data storage library of FIG. 1.

Referring additionally to FIG. 3, in one embodiment, library manager 24 is associated with accessor 16 and library manager 25 is associated with accessor 17. The library manager 24 and associated accessor 16 may be located at one end of the library aisle and designated the "A" library manager and "A" accessor. Similarly, the library manager 25 and associated accessor 17 are at the opposite end of the library aisle and designated the "B" library manager and "B" accessor. The accessor 16 is called the "local" accessor with respect to library manager 24. The accessor 17 is called the "remote" accessor with respect to library manager 24. Similarly, accessor 17 is called the "local" accessor and accessor 16 is called the "remote" accessor with respect to library manager 25.

Library manager 24 includes an execution coordinator 40 which provides communication with accessor 16. The library manager processor and execution coordinator may be housed together with the accessor servo controller and DI/DO card, as is illustrated in FIG. 3. The library manager 24 and execution coordinator 40 are interconnected with library manager 25 and its associated execution coordinator 41 over a communication link 42. The communication link 42 may comprise, e.g., a conventional Ethernet link.

The present invention may be utilized with a single library manager, or with the illustrated multiple library managers. In accordance with the present invention, one of the accessors is designated as the "active" accessor. In one embodiment, only the active accessor has authorization to be in the aisle and handles all of the operations of the library. This sole authorization may also be called "full aisle mode". In a dual accessor library, in full aisle mode, the accessor that is not servicing aisle requests, is the "standby" accessor. If the standby accessor is capable of performing the functions of an active accessor, it is considered to be "available" in "hot standby mode". If the standby accessor is not capable of performing the functions of an active accessor, it is considered to be "unavailable". Referring to FIG. 1, the standby accessor is moved to the end of the library 44 or 45 and out of the aisle. The ends 44 and 45 of the library are called "service" or "standby" areas.

Automated data storage libraries typically are initialized at the IPL (initial program load) of the library which occurs: (a) upon the installation of the library; (b) after a data recording device, a frame of storage slots, or an accessor has been changed or added; and (c) any other power off shut down. The library must be initialized after a power off shut down because of the possibility that one or more subassemblies, such as a data recording device, etc., may have been changed while power was off.

Automated data storage libraries also may transition between "pause" and "auto" modes. The "auto" mode is entered when the library is fully operating. The "pause" mode is entered when the automated operations of the library are stopped, but power to the library remains on. Examples of "pause" mode are: (a) a service representative or operator needs to enter the library aisle to insert a large number of cartridges, greater than can be handled by the import/export port; (b) there is a failure of a data recording device requiring the service representative to enter the library aisle to pull a cartridge out of the drive; (c) a cartridge is snagged in one of the grippers, requiring that a service representative enter the aisle; (d) a service representative must enter the aisle to clear the aisle of dropped cartridge(s); or (e) if the active accessor cannot push an unavailable accessor out of the aisle.

In a conventional dual accessor library, one of the accessors is typically always the active accessor, and the other(s) are always standby or spare. The accessors are typically located at opposite ends of the aisle, the accessor at the "A" end of the aisle would typically be the active accessor, and the other accessor at the opposite "B" end of the aisle would typically be the standby accessor. The only time that the accessors are switched automatically is when the active accessor fails.

The present invention provides the ability to instead select the best accessor as the active accessor.

Specifically, an accessor may be in less than fully available condition, having one or more of its components unavailable, but still be usable. The present invention calls such an accessor "degraded", and, if the degraded accessor is the "A" accessor, will allow designation of a fully available or otherwise better accessor to be designated as the "active" accessor, even though the better accessor is not the "A" accessor. Referring to FIG. 2, a degraded accessor may have one of the grippers 37 or 38, and/or the scanner 39 unavailable.

The present invention, in one embodiment, sets the operation modes of the plurality of accessors between an active mode and a standby mode, with only one of the plurality of accessors being in the active mode at one time. Referring to FIGS. 1 and 3, the active one of the library managers 24 or 25 sets the operation mode of one of the accessors 16 or 17 to the active mode in an initial decision (A), first (1), based on the relative conditions of the accessors, the conditions having three levels (a) fully available, (b) degraded, and (c) not available, and, if all the accessors are in the same level of condition, second (2), an arbitrarily selected accessor, for example, based on the one of the accessors that is local with respect to the active library manager. Then, the library manager 24 or 25, in an override decision (B), based upon the designated active accessor, as designated at the operator interface 28 or, if not designated thereat, based on the one of the accessors last in the active mode, unless the previously designated active accessor is not available.

If the override decision is made immediately after the initial decision, and there is no input from the operator interface, the arbitrarily designated accessor will be the accessor designated by the initial decision.

The operator inerface designation is very important when both accessors are equally operational, in that one of the accessors may have a minor problem that does not make it or a component unavailable. An example of such a problem might be a tendency of one of the grippers of an accessor to occasionally not fully release a data storage media when placing the media in a storage slot. Thus, when the accessor gripper is withdrawn from a storage slot, it may occasionally drag the data storage media with it, dropping the media on the floor of the aisle. The operator may note this problem and will therefore designate another accessor as the preferred accessor. The operator may also have reason to believe that the selected accessor is more reliable, such as having recently inspected or repaired the accessor.

Figure 4:
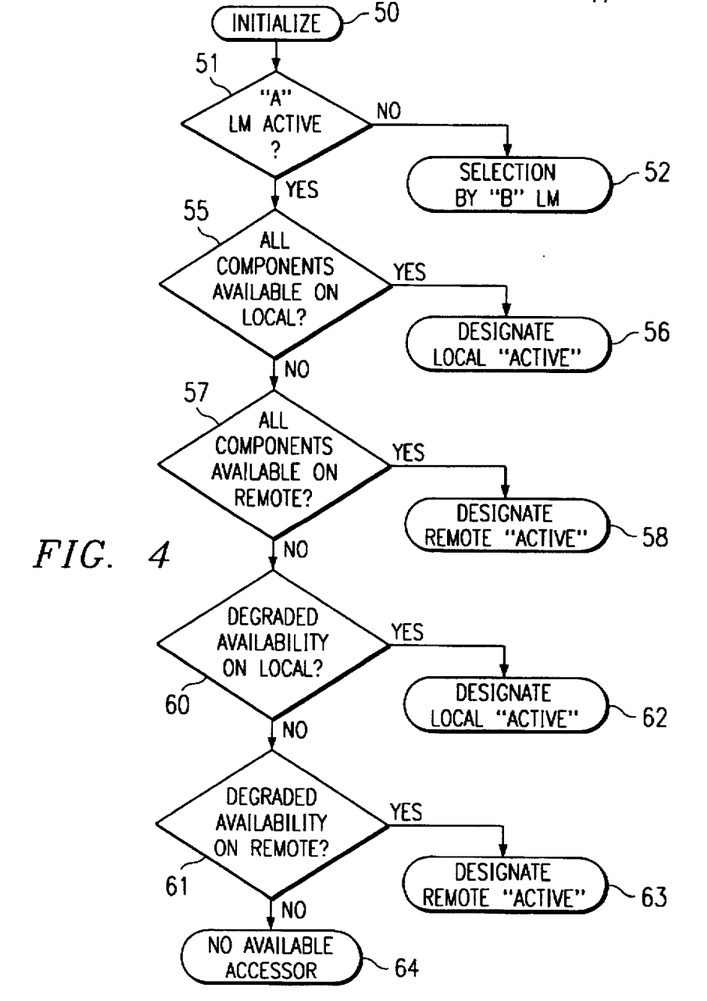
FIG. 4 is a flow chart depicting the method of the present invention in the initial decision setting operation modes of the automated data storage library of FIG. 1.

Referring to FIG. 4, a flow chart depicts the method of the present invention in the initial decision, setting operation modes of the automated data storage library of FIG. 1. For the purpose of illustration, it will be assumed that library manager 24 of FIG. 3 is the active library manager which will make the designation of the "active" accessor, and that the "local" accessor is accessor 16, so that accessor 17 is the "remote" accessor.

The initialization process is entered at step 50 in FIG. 3, which is described above as occurring at power on, etc. The first decision 51 is whether the "A" library manager 24 is available to make the selection of the active accessor. If "NO", the selection process will be conducted 52 by the "B" library manager 25.

The process for first determining whether the accessors have equal capability and, if they are equal, arbitrarily selecting an accessor, or, if they are not equal, selecting the best accessor, may be conducted in many ways.

The arbitrary selection may be made on the basis of performance and low communication risk by selecting the accessor that is "local" with respect to the active library manager. Alternatively, the accessor having the least total hours of use may be selected to even the wear of the accessors.

The flow diagram of FIG. 4 illustrates one of many alternatives for conducting the selection process and is laid out so that the first decision 55 is whether all the components of the local accessor 16 are available. If all components are available, "YES", then the local accessor 16 is at least equal in capability to the remote accessor 17 and is therefore selected in step 56. If, however, one or more of the components of the local accessor 16 is unavailable, "NO", the remote accessor is checked in step 57. If all the components of the remote accessor are determined to be available in step 57, "YES", step 58 then designates the remote accessor 17 as the active accessor.

If, however, one or more of the remote accessor components are also not available, the accessors are then each checked in steps 60 and 61 for the availability of enough components that the accessors can operate, although they may be degraded. If the local accessor 16 is available, "YES" in step 60, then it is selected in step 62. If local accessor 16 is not available in degraded mode, "NO", step 61 determines whether remote accessor 17 is available. If remote accessor 17 is available, though degraded, "YES", it is selected in step 63. If remote accessor 17 is also not available, there is no available accessor as indicated in step 64.

Figure 5:
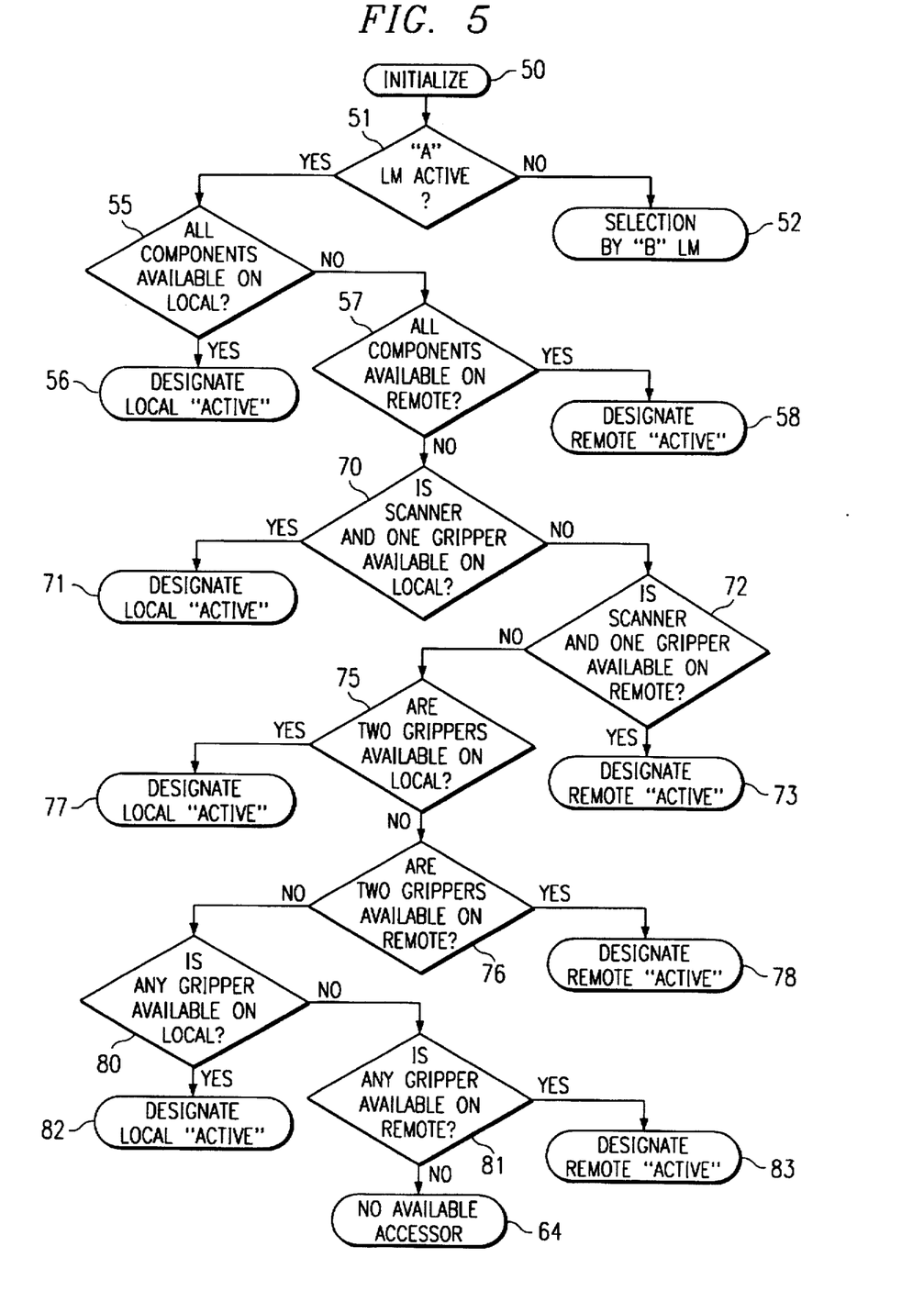
FIG. 5 is a flow chart depicting a more detailed aspect of the method of FIG. 4.

The initial selection of an "active" accessor may be more detailed than that of FIG. 4. FIG. 5 illustrates a more detailed process accommodating various levels of degradation of the accessors.

In the embodiment of FIG. 5, steps 50–58 are the identical steps as in FIG. 4, determining whether all the components are available, first, for the local accessor 16, and, then, for the remote accessor 17. If neither accessor has all components available, step 70 determines whether the local accessor is at the least level of degradation. In the embodiment of FIG. 5, the least level of degradation is whether both the scanner 39 and one of the gripper 37 or 38 (see FIG. 2) is available. In the embodiment of FIG. 2, this means that only one of the grippers 37 or 38 is not available. If so, "YES", then the local accessor 16 is selected in step 71. If not, "NO", then the remote accessor is checked for the same availability in step 72. If one gripper and the scanner are available for the remote accessor 17, step 73 designates the accessor as the "active" accessor.

If neither accessor is at the least degraded level, "NO" in step 72, steps 75 and 76 check the local and remote accessors, respectively, for the next level of degradation. In the embodiment of FIG. 5, the next level of degradation is the availability of two grippers 37 and 38, thereby indicating that scanner 39 is not available. If the local accessor 16 has both grippers available, step 77 designates the local accessor as "active", and, if not, but the remote accessor 17 has both grippers available, step 78 designates the remote accessor as "active".

If neither accessor is at the second level of degradation, steps 80 and 81 check the local and remote accessors, respectively, for the last level of degradation. In the embodiment of FIG. 5, the last level of degradation is the availability of one gripper 37 or 38, thereby indicating that the scanner 39 and one of the grippers are not available. If the local accessor 16 has one gripper available, step 82 designates the local accessor as "active", and, if not, but the remote accessor 17 has one gripper available, step 83 designates the remote accessor as "active".

If neither accessor has one gripper available, there is no available accessor as indicated in step 64.

Figure 6:
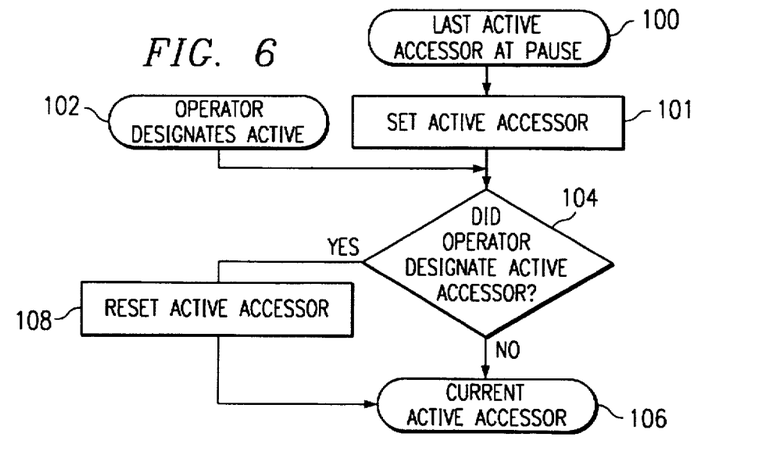
FIG. 6 is a flow chart depicting the method of the present invention in the operator designation of the active accessor of the automated data storage library of FIG. 1.
Figure 7:
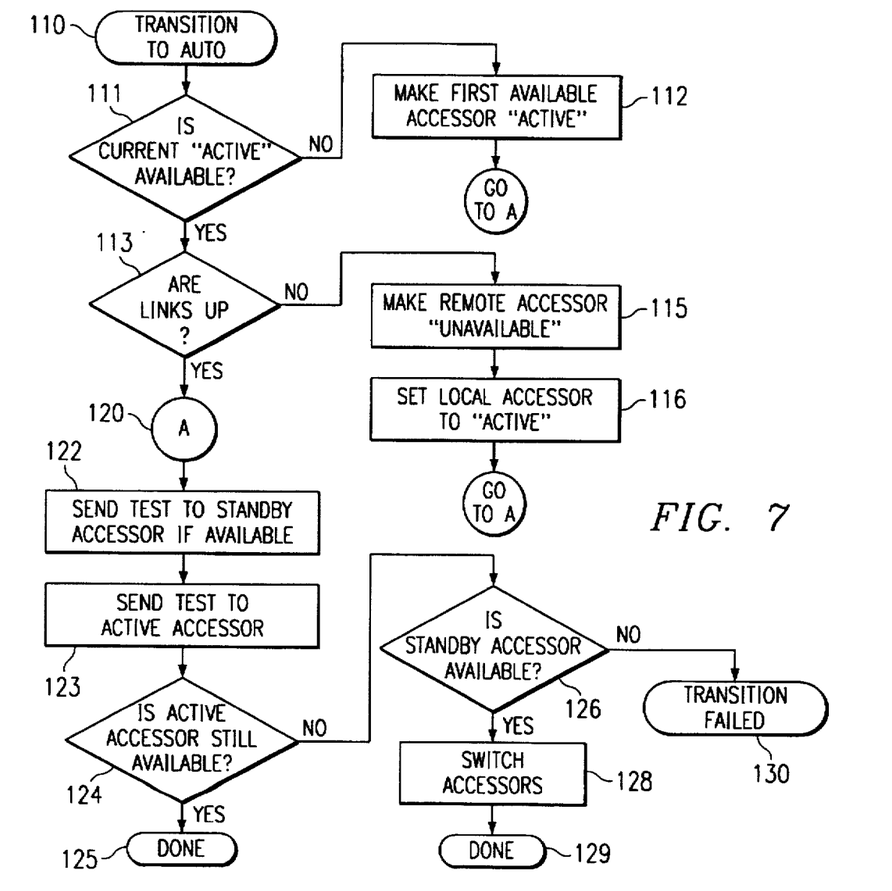
FIG. 7 is a flow chart depicting the method of the present invention in the override decision of the automated data storage library of FIG. 1.

Once the "active" accessor has been selected in the process of FIG. 4 or in the process of FIG. 5, that accessor will remain the active accessor until either it becomes unavailable, or, if before a transition from pause to auto, another accessor is designated as the active accessor by the operator at the operator interface, as illustrated in FIGS. 6 and 7.

Referring to the embodiment illustrated in FIGS. 6 and 7, although an operator may change the designation of which accessor is the active accessor, that selection is not implemented until after the library has entered a pause state and is returning to the auto state. At the transition from the pause state to the auto state, the previous designation of the "active" accessor may be overridden by the operator, unless the accessor selected by the operator is unavailable. For example, when the operator attempts to select the accessor, a warning is posted at the operator interface.

Specifically, when entering into, or during, the pause state, steps 100 and 101 maintain the designation of the active accessor as it was preceding the pause state. At some earlier time, or during the pause state, the operator may use the operator interface to designate an accessor as the intended "active" accessor. This entry is indicated as step 102. Step 104 determines whether the operator has designated an active accesor. If "NO", the previous active accessor is designated as the current active accessor in step 106.

If the operator has designated an accessor as the "active" accessor in step 102, "YES" in step 104, step 108 resets the designation of the "active" accessor to that selected by the operator. The operator may or may not select the currently active accessor in step 102, but step 108 resets the accessor designation in either case to insure that the operator's selection is implemented. As described above, the operator may select an accessor as active because another accessor may have a problem, or because the operator is more certain of the reliability of the selected accessor.

Referring to FIG. 7, upon the transition from pause to auto at step 110, step 111 determines whether the currently active accessor from step 106 in FIG. 6, is available. For example, the power to the accessor may not have been turned on. If step 111 indicates that the current "active" accessor is unavailable, step 112 makes the first accessor that is or becomes available, the "active" accessor.

Step 113 determines whether the links 42 in FIG. 3 are up. If not, the library manager 24 cannot communicate with the remote accessor 17, and steps 115 and 116 therefore make the remote accessor 17 unavailable and set the local accessor 16 to "active".

If the links are up, the process procedes to connector 120 which merges with the selected one of steps 112, or 116 or "YES" in step 113.

In the embodiment of FIG. 7, the library manager then tests each of the accessors 16 and 17 in steps 122 and 123, respectively, to insure that each accessor is still available. Step 124 determines whether the "active" accessor is still available, and, if so, the override process is complete 125. If, however, step 124 determines that the "active" accessor is not still available, step 126 determines whether the standby accessor is still available. If so, step 128 switches the "active" accessor and the override process is completed 129.

If step 126 determines that the test indicates that the standby accessor is also unavailable, the transition has failed and is indicated in step 130.

Thus, the initialization process designates an accessor as active based on certain levels of availability and degradation as illustrated in FIGS. 4 or 5, and that designation may be overridden upon the transition from pause to auto by an operator input at operator interface 28 in FIG. 1, or by the unavailability of the designated accessor, as illustrated in FIGS. 6 and 7.

While the preferred embodiments of the present invention have been illustrated in detail, it should be apparent that modifications and adaptations to those embodiments may occur to one skilled in the art without departing from the scope of the present invention as set forth in the following claims.

We claim:

1. An automated data storage library for storing and accessing a plurality of data storage media stored in a plurality of storage slots, said library having at least one data recording device for receiving said data storage media and reading and/or writing data thereon, comprising:

a plurality of accessors for accessing and transporting said data storage media between said storage slots and said data recording device;

an operator interface allowing an operator to communicate with said automated data storage library to designate one of said accessors as active; and a library manager interconnected with said plurality of accessors and with said operator interface for setting operation modes of said plurality of accessors between an active mode and a standby mode, only one of said plurality of accessors being in said active mode at one time, said library manager setting said operation mode of one of said accessors to said active mode in an initial decision (A) based upon, first (1), the relative conditions of said accessors, said conditions having three levels (a) fully available, (b) degraded, and (c) not available, and, if all said accessors are in the same one of said three condition levels, second (2), an arbitrarily selected one of said accessors, and in an override decision (B) based upon a designated active accessor, if designated at said operator interface or, if not designated thereat, the one of said accessors last in said active mode, unless said designated active accessor is not available.

2. The automated data storage library of claim 1, wherein said library is first initialized, and subsequently transitions between automated operation and pause states, and wherein said library manager provides said initial decision (A) upon said initialization of said library, and provides said override decision (B) upon said transition of said library from a pause to automated operation state.

3. The automated data storage library of claim 1, wherein said plurality of accessors each comprises as components thereof at least one gripper, a scanner, a communication link and robotic components, and said accessor condition levels comprise (a) fully available if all of said components are operational, (b) degraded in the order of (i) at least one of said grippers and said scanner are available, (ii) said scanner is not available and two of said grippers are available, and (iii) only one of said grippers is available, and (c) not available upon the conditions including at least one of (i) all of said grippers are not operational or (ii) said communication link is not operational or (iii) said robotic components are not operational.

4. The automated data storage library of claim 1, wherein said library manager tests said accessors subsequent to said decisions to determine whether said accessors are not available, and if said designated active accessor is not available, but a different one of said accessors is available, designating said different accessor as active.

5. The automated data storage library of claim 1, wherein said library manager is associated with one of said plurality of accessors, called a local accessor, and said library manager sets said operation modes in said initial decision (A) based upon, first (1), the relative conditions of said accessors, said conditions having three levels (a) fully available, (b) degraded, and (c) not available, and, if all said accessors are in the same one of said three condition levels, second (2), the one of said accessors which is local to said library manager.

6. The automated data storage library of claim 5, wherein said plurality of accessors each comprises as components thereof at least one gripper, a scanner, a communication link and robotic components, and said accessor condition levels comprise (a) fully available if all of said components are operational, (b) degraded in the order of (i) at least one of said grippers and said scanner are available, (ii) said scanner is not available and two of said grippers are available, and (iii) only one of said grippers is available, and (c) not available upon the conditions including at least one of (i) all of said grippers are not operational or (ii) said communication link is not operational or (iii) said robotic components are not operational.

7. The automated data storage library of claim 1, comprising a plurality of library managers, each associated with one of said accessors, and one of said library managers is active, and said active library manager associated accessor is called a local accessor, and wherein said active library manager sets said operation modes in said initial decision (A) based upon, first (1), the relative conditions of said accessors, said conditions having three levels (a) fully available, (b) degraded, and (c) not available, and, if all said accessors are in the same one of said condition levels, second (2), the one of said accessors which is local to said active library manager.

8. The automated data storage library of claim 7, wherein said plurality of accessors each comprises as components thereof, at least one gripper, a scanner, a communication link and robotic components, and said accessor condition levels comprise (a) fully available if all of said components are operational, (b) degraded in the order of (i) at least one of said grippers and said scanner are available, (ii) said scanner is not available and two of said grippers are available, and (iii) only one of said grippers is available, and (c) not available upon the conditions including at least one of (i) all of said grippers are not operational or (ii) said communication link is not operational or (iii) said robotic components are not operational.

9. The automated data storage library of claim 7, wherein said library manager tests said accessors subsequent to said decisions to determine whether said accessors are not available, and if said designated active accessor is not available, but a different one of said accessors is available, designating said different accessor as active.

10. An automated data storage library for storing and accessing a plurality of data storage media stored in a plurality of storage slots, comprising:

at least one data recording device for receiving said data storage media and reading and/or writing data thereon;

a plurality of accessors for accessing and transporting said data storage media between said storage slots and said data recording device;

an operator interface allowing an operator to communicate with said automated data storage library to designate one of said accessors as active;

a plurality of standby stations for storing said accessors designated as standby; and a library manager interconnected with said plurality of accessors and with said operator interface for setting operation modes of said plurality of accessors between said active mode and said standby mode, only one of said plurality of accessors being in said active mode at one time, said library manager setting said operation mode of one of said accessors to said active mode in an initial decision (A) based upon, first (1), the relative conditions of said accessors, said conditions having three levels (a) fully available, (b) degraded, and (c) not available, and, if all said accessors are in the same one of said three condition levels, second (2), an arbitrarily selected one of said accessors, and in an override decision (B) based upon a designated active accessor, if designated at said operator interface or, if not designated thereat, the one of said accessors last in said active mode, unless said designated active accessor is not available, and designating all remaining said accessors as standby and directing said standby accessors to said standby stations.

11. The automated data storage library of claim 10, wherein said library is first initialized, and subsequently transitions between automated operation and pause states, and wherein said library manager provides said initial decision (A) upon said initialization of said library, and provides said override decision (B) upon said transition of said library from a pause to automated operation state.

12. The automated data storage library of claim 10, wherein said plurality of accessors each comprises as components thereof at least one gripper, a scanner, a communication link and robotic components, and said accessor condition levels comprise (a) fully available upon all of said components are operational, (b) degraded in the order of (i) at least one of said grippers and said scanner are available, (ii) said scanner is not available and two of said grippers are available, and (iii) only one of said grippers is available, and (c) not available upon the conditions including at least one of (i) all of said grippers are not operational or (ii) said communication link is not operational or (iii) said robotic components are not operational.

13. The automated data storage library of claim 10, wherein said library manager tests said accessors subsequent to said decisions to determine whether said accessors are not available, and if said designated active accessor is not available, but a different one of said accessors is available, designating said different accessor as active.

14. The automated data storage library of claim 10, wherein said library manager is associated with one of said plurality of accessors, called a local accessor, and said library manager sets said operation modes in said initial decision (A) based upon, first (1), the relative conditions of said accessors, said conditions having three levels (a) fully available, (b) degraded, and (c) not available, and, if all said accessors are in the same one of said three condition levels, second (2), the one of said accessors which is local to said library manager.

15. The automated data storage library of claim 10, comprising a plurality of library managers, each associated with one of said accessors, and one of said library managers is active, and said active library manager associated accessor is called a local accessor, and wherein said active library manager sets said operation modes in said initial decision (A) based upon, first (1), the relative conditions of said accessors, said conditions having three levels (a) fully available, (b) degraded, and (c) not available, and, if all said accessors are in the same one of said three condition levels, second (2), the one of said accessors which is local to said active library manager.

16. A method for setting operation modes of a plurality of accessors of an automated data storage library, said automated data storage library having a plurality of storage slots for storing a plurality of data storage media, having at least one data recording device for receiving data storage media and reading and/or writing data thereon, having an operator interface allowing an operator to communicate with said automated data storage library to designate one of said accessors as active, and having a library manager interconnected with said plurality of accessors and with said operator interface, said plurality of accessors accessing and transporting said data storage media between said storage slots and said data recording device, said method setting operation of said plurality of accessors between an active mode and a standby mode, comprising the steps of:

(A) initially setting said operation modes based upon, first (1), the relative conditions of said accessors, said conditions having three levels (a) fully available, (b) degraded, and (c) not available, and, if all said accessors are in the same one of said three condition levels, second (2), an arbitrarily selected one of said accessors; and (B) subsequent to, and overriding said initial step, setting said operation modes based upon a designated active accessor, if designated at said operator interface or, if not designated thereat, the one of said accessors last in said active mode, unless said designated active accessor is not available.

17. The method for setting operation modes of a plurality of accessors of an automated data storage library of claim 16, wherein said library is first initialized, and subsequently transitions between automated operation and pause states, and wherein said initial setting step (A) is conducted upon said initialization of said library, and wherein said override step (B) is conducted upon said transition of said library from a pause to automated operation state.

18. The method for setting operation modes of a plurality of accessors of an automated data storage library of claim 17, wherein said plurality of accessors each comprises as components thereof at least one gripper, a scanner, a communication link and robotic components, and wherein said initial setting step (A) accessor condition levels comprise (a) fully available if all of said components are operational, (b) degraded in the order of (i) at least one of said grippers and said scanner are available, (ii) said scanner is not available and two of said grippers are available, and (iii) only one of said grippers is available, and (c) not available upon the conditions including at least one of (i) all of said grippers are not operational or (ii) said communication link is not operational or (iii) said robotic components are not operational.

19. The method for setting operation modes of a plurality of accessors of an automated data storage library of claim 17, wherein, subsequent to said initial setting and said override steps (B) additionally comprises testing said accessors to determine whether said accessors are not available, and if said designated active accessor is not available, but a different one of said accessors is available, designating said different accessor as active.

20. The method for setting operation modes of a plurality of accessors of an automated data storage library of claim 17, wherein said library manager is associated with one of said plurality of accessors, called a local accessor, and wherein said initial setting step (A) comprises setting said operation modes based upon, first (1), the relative conditions of said accessors, said conditions having three levels (a) fully available, (b) degraded, and (c) not available, and, if all said accessors are in the same one of said three condition levels, second (2), the one of said accessors which is local to said library manager.

21. The method for setting operation modes of a plurality of accessors of an automated data storage library of claim 17, wherein said library manager comprises a plurality of library managers, each associated with one of said accessors, and one of said library managers is active, and said active library manager associated accessor is called a local accessor, and wherein said initial setting step (A) comprises setting said operation modes based upon, first (1), the relative conditions of said accessors, said conditions having three levels (a) fully available, (b) degraded, and (c) not available, and, if all said accessors are in the same one of said three condition levels, second (2), the one of said accessors which is local to said active library manager.

* * * * *